US008683140B2

(12) United States Patent
Guthrie et al.

(10) Patent No.: US 8,683,140 B2
(45) Date of Patent: *Mar. 25, 2014

(54) CACHE-BASED SPECULATION OF STORES FOLLOWING SYNCHRONIZING OPERATIONS

(75) Inventors: Guy L. Guthrie, Austin, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 13/456,420

(22) Filed: Apr. 26, 2012

(65) Prior Publication Data

US 2012/0210072 A1    Aug. 16, 2012

Related U.S. Application Data

(63) Continuation of application No. 12/985,590, filed on Jan. 6, 2011, now Pat. No. 8,412,888.

(51) Int. Cl.
*G06F 12/00* (2006.01)

(52) U.S. Cl.
USPC ........... 711/141; 711/119; 711/122; 711/137; 711/147

(58) Field of Classification Search
None
See application file for complete search history.

(56) References Cited

U.S. PATENT DOCUMENTS

| 8,412,888 B2 * | 4/2013 | Guthrie et al. ................ 711/141 |
| 2006/0026371 A1 * | 2/2006 | Chrysos et al. ............... 711/158 |

OTHER PUBLICATIONS

U.S. Appl. No. 12/985,590 entitled "Cache-Based Speculation of Stores Following Synchronizing Operations"; Notice of Allowance dated Nov. 27, 2012 (11 pp.).

* cited by examiner

*Primary Examiner* — Shawn X Gu
(74) *Attorney, Agent, or Firm* — Yudell Isidore Ng Russell PLLC

(57) ABSTRACT

A method of processing store requests in a data processing system includes enqueuing a store request in a store queue of a cache memory of the data processing system. The store request identifies a target memory block by a target address and specifies store data. While the store request and a barrier request older than the store request are enqueued in the store queue, a read-claim machine of the cache memory is dispatched to acquire coherence ownership of target memory block of the store request. After coherence ownership of the target memory block is acquired and the barrier request has been retired from the store queue, a cache array of the cache memory is updated with the store data.

8 Claims, 8 Drawing Sheets

US 8,683,140 B2

CACHE-BASED SPECULATION OF STORES FOLLOWING SYNCHRONIZING OPERATIONS

The present application is a continuation of U.S. patent application Ser. No. 12/985,590, filed on Jan. 6, 2011, and entitled "CACHE-BASED SPECULATION OF STORES FOLLOWING SYNCHRONIZING OPERATIONS,," now U.S. Pat. No. 8,412,888, the disclosure of which is hereby incorporated herein by reference in its entirety for all purposes.

BACKGROUND OF THE INVENTION

1. Technical Field

The present invention relates in general to data processing and, in particular, to improved data processing system and cache memories for data processing systems. Still more particularly, the present invention relates to speculative processing of stores following synchronizing operations in a cache memory of a data processing system.

2. Description of the Related Art

Multiprocessor data processing system implement a variety of consistency models that govern the order in which memory access instructions are performed with respect to a shared memory. For example, in multiprocessor data processing system implementing a strongly consistent memory model, memory accesses are performed with respect to shared memory strictly in program order. Weakly consistent architectures, on the other hand, permit some reordering of memory access operations as long as data dependencies are observed and any given processor does not access an older value of a memory location (i.e., "stale" data) after accessing a newer value of the same memory location.

Because weakly consistent architectures permit the memory access operations comprising a sequence of memory access operations to be performed in a variety of different orders, programmers commonly place barrier instructions within the instruction sequence to enforce a desired ordering among the memory access operations. In particular, a barrier instruction ensures that all memory access operations indicated by the instructions preceding the barrier instruction are visible to all processors before any memory access operation initiated by an instruction subsequent to the barrier instruction is performed. In a typical implementation, the barrier instruction, when executed by a processor, generates a barrier operation communicated to all other processors in the multiprocessor data processing system via an interconnect. When each of the other processors completes all memory access instructions preceding the barrier operation, the processors transmit acknowledgements of the barrier operation to the issuing processor, which completes the barrier operation and then permits subsequent memory access operations to be performed.

Barrier instructions and the associated barrier operations significantly burden data processing system efficiency by causing pipeline stalls within the processors, utilizing bandwidth on the system interconnect, and creating inefficiencies in the handling of memory access operations by the cache memories supporting the processors.

SUMMARY OF THE INVENTION

In at least one embodiment, a method of processing store requests in a data processing system includes enqueuing a store request in a store queue of a cache memory of the data processing system. The store request identifies a target memory block by a target address and specifies store data. While the store request and a barrier request older than the store request are enqueued in the store queue, a read-claim machine of the cache memory is dispatched to acquire coherence ownership of target memory block of the store request. After coherence ownership of the target memory block is acquired and the barrier request has been retired from the store queue, a cache array of the cache memory is updated with the store data.

DETAILED DESCRIPTION OF ILLUSTRATIVE EMBODIMENT

Figure 1:
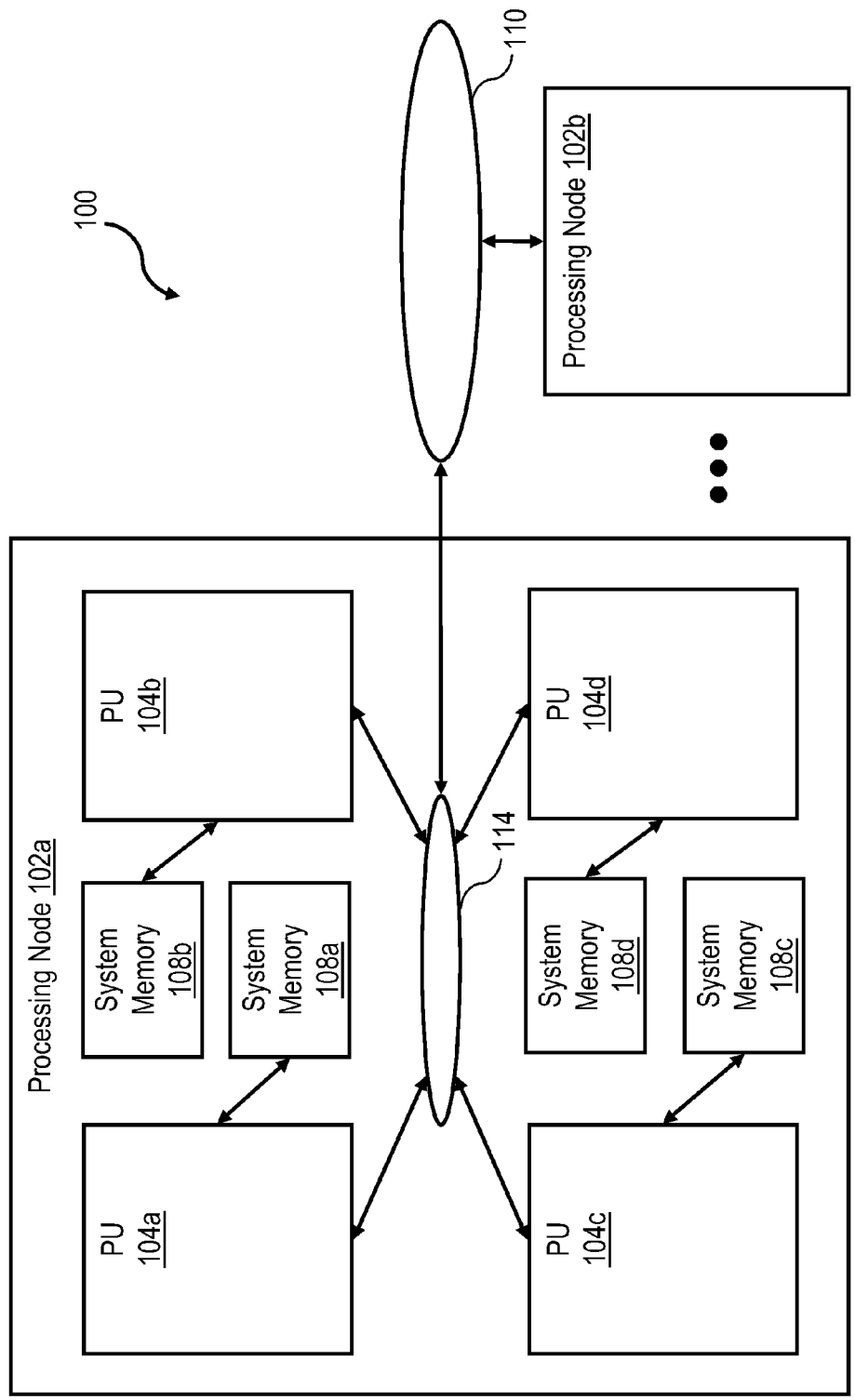
FIG. 1 is a high level block diagram of an exemplary data processing system in accordance with one embodiment.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect, or a hybrid interconnect.

In the depicted embodiment, each processing node 102 is realized as a multi-chip module (MCM) containing four processing units 104a-104d, each realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
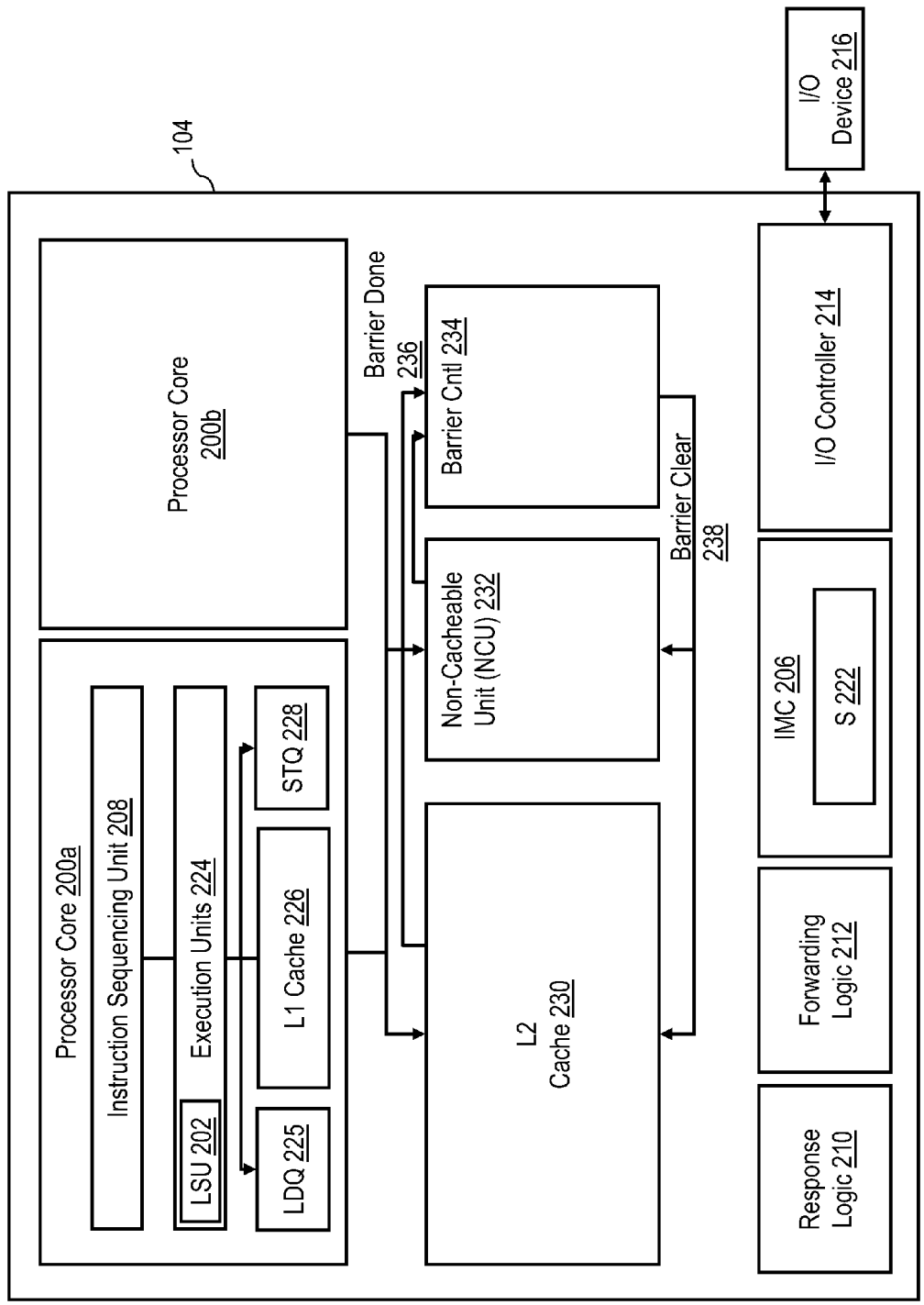
FIG. 2 is a more detailed block diagram of a processing unit in the data processing system of FIG. 1.

Referring now to FIG. 2, there is depicted a more detailed block diagram of an exemplary embodiment of a processing unit 104 in data processing system 100 of FIG. 1. In the depicted embodiment, each processing unit 104 includes two processor cores 200a, 200b for independently processing instructions and data. In at least some embodiments, processor cores 200 can support multiple simultaneous hardware threads of execution. Each processor core 200 includes at least an instruction sequencing unit (ISU) 208 for fetching and ordering instructions in each thread for execution and one or more execution units 224 for executing instructions. As shown, execution units 224 include a load-store unit (LSU) 202, which executes instructions that request access to a memory block, cause the generation of a request for access to a memory block, or synchronize memory accesses. Processor core 200 additionally includes a load queue (LDQ) 225 and a store queue (STQ) 228 that respectively buffer load and store operations generated by the execution of instructions by LSU 202 prior to their presentation by the processor core 200 to the remainder of the system.

As shown, each processor core 200 is supported by a multi-level volatile memory hierarchy having at its lowest level shared system memories 108, and at its upper levels one or more levels of cache memory, which in the illustrative embodiment include a store-through level one (L1) cache 226 within and private to each processor core 200, and a respective store-in level two (L2) cache 230 shared by processor cores 200a, 200b. Although the illustrated cache hierarchies includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Processing unit 104 further includes a non-cacheable unit (NCU) 232 that performs memory accesses to non-cacheable real memory addresses and a barrier controller 234 that enforces barrier operations that synchronize memory access operations across L2 caches 230 and NCUs 232. As indicated, to support such synchronization, barrier controller 234 is coupled to L2 cache 230 and NCU 232 by a respective one of barrier done signals 236 and is coupled to L2 cache 230 and NCU 232 by a barrier clear signal 238.

Each processing unit 104 further includes an instance of response logic 210, which implements a portion of the distributed coherency signaling mechanism that maintains cache coherency within data processing system 100. In addition, each processing unit 104 includes an instance of forwarding logic 212 for selectively forwarding communications between its local interconnect 114 and system interconnect 110. Processing unit 104 also includes an integrated memory controller (IMC) 206 that controls access to a respective one of system memories 108. As indicated, IMC 206 includes a snooper 222 that snoops memory access requests on local interconnect 114. Finally, each processing unit 104 includes an integrated I/O (input/output) controller 214 supporting the attachment of one or more I/O devices, such as I/O device 216.

In operation, when a hardware thread of execution under execution by a processor core 200 includes a memory access instruction requesting a specified memory access operation to be performed, LSU 202 executes the memory access instruction to determine the target real address of the memory access operation. Load requests generated by the execution of load instructions are buffered in LDQ 225, and store and barrier requests generated by the execution of store and barrier instructions are buffered in STQ 228. The target real address of each memory access request is hashed to identify the appropriate destination (e.g., L2 cache 230 or NCU 232), and the memory access requests are then dispatched to L2 cache 230 or NCU 232 for handling.

Figure 3:
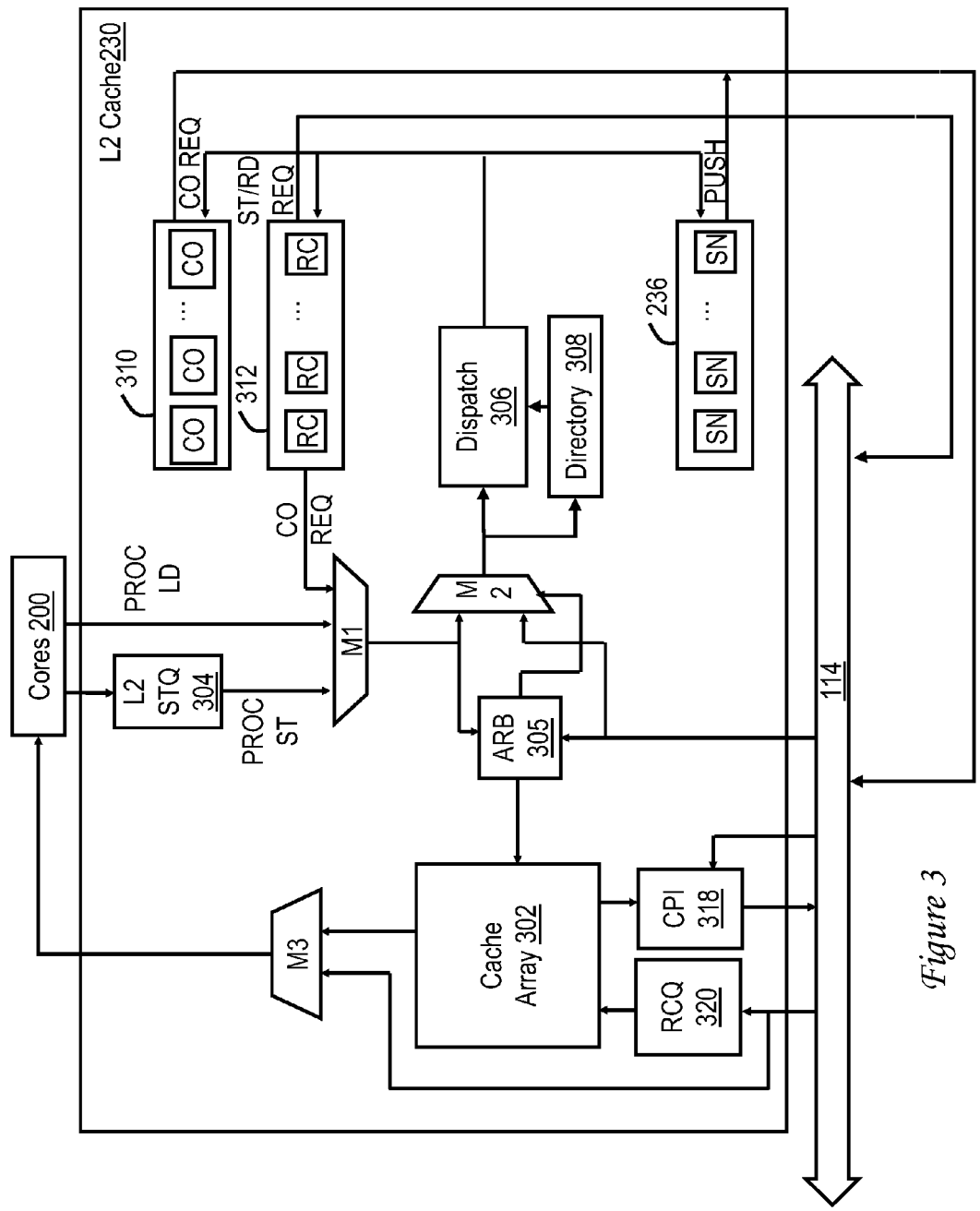
FIG. 3 is a more detailed block diagram of the L2 cache of FIG. 2.

With reference now to FIG. 3, there is illustrated a more detailed block diagram of an exemplary embodiment of L2 cache 230 in accordance with one embodiment. L2 cache 230 includes a cache array 302 and a directory 308 of the contents of cache array 302. Assuming cache array 302 and directory 308 have a set-associative organization as is conventional, memory locations in system memories 108 are mapped to particular congruence classes within cache array 302 utilizing predetermined index bits within the system memory (real) addresses. The particular memory blocks stored within cache array 302 are recorded in directory 308, which contains one directory entry for each cache line in cache array 302.

While not expressly depicted in FIG. 3, it will be understood by those skilled in the art that each directory entry in cache directory 308 includes various fields, such as a tag field that identifies by a tag portion of a real address the particular cache line stored in a corresponding entry of cache array 302 and a state field that indicates the coherence state of the particular cache line according to a selected coherence protocol implemented by data processing system 100. The selected coherence protocol, for example, the well-known MOESI (Modified, Owner, Exclusive, Shared, Invalid) protocol or a variant thereof, preferably includes at least one coherence state identifying a cache memory that has coherence ownership of the associated cache line, that is, the authority to grant or deny requests to update (modify) the associated cache line. Cache directory 308 may additionally indicate other metadata, such as the relative replacement order of the cache lines within each congruence class.

Figure 4:
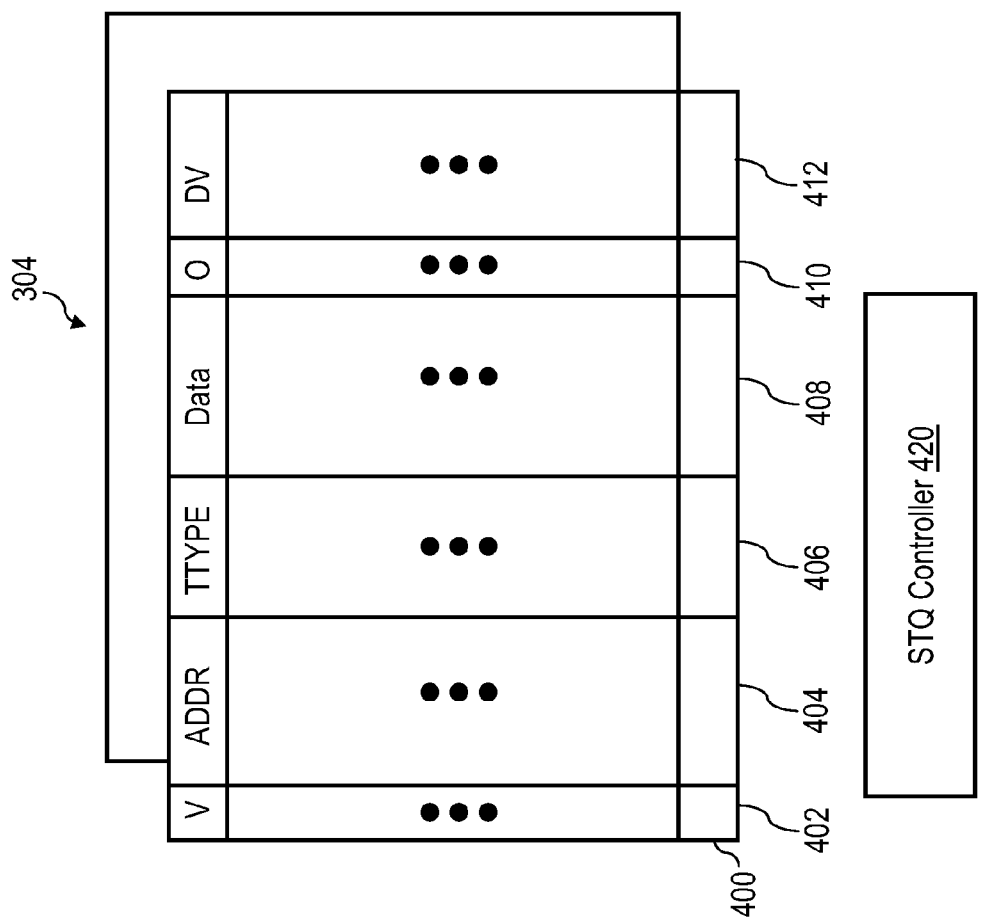
FIG. 4 is a more detailed view of the L2 store queue (STQ) of FIG. 3.

L2 cache 230 has an L2 store queue (L2 STQ) 304 for buffering store and barrier requests received from the processor cores 200 of the same processing unit 104. As shown in FIG. 4, L2 STQ 304 includes a STQ controller 420 and respective buffer storage for each hardware thread supported by the associated processor cores 200. The buffer storage for each hardware thread includes multiple entries 400, each having a number of fields for holding information for a particular operation. In the depicted exemplary embodiment, the fields of each entry 400 include a valid (V) field 402 indicating the validity of the contents of the entry 400, an address (ADDR) field 404 for holding the target address, if any, of the operation, a transaction type (ttype) field 406 for holding a transaction type of the request (e.g., a store request or a barrier request), and a data field 408 for holding data, if any, of the request. As described further below, each entry 400 additionally includes a owner (O) field 410 indicating whether or not the target memory block of a store request is known by STQ controller 412 to be held in L2 cache 230 in a coherence ownership state, and a dependency vector (DV) field 412. For barrier requests, DV field 412 identifies the older store requests in L2 STQ 304, if any, upon which retirement of the barrier request depends. In at least some embodiments, for store requests, DV field 412 identifies the youngest barrier request in L2 STQ 304, if any, that is older than the store request.

Returning to FIG. 3, L2 cache 230 further includes an arbiter 305 that controls multiplexers M1 and M2 to arbitrate the order of processing of memory access requests received from processor cores 200 and local interconnect 114. Memory access requests, including load and store requests, are forwarded in accordance with the arbitration policy implemented by arbiter 305 to a dispatch pipeline 306, where each load and store request is processed with respect to directory 308 over a given number of cycles. In particular, in a preferred embodiment, dispatch pipeline 306 contains a number of latched stages from which, inter alia, access is made to L2 cache directory 308 to determine the coherence state of the requested real address and to append the coherence state to the memory access request.

L2 cache 230 also comprises RC (read claim) machines 312 that can each independently and concurrently handle a processor memory access request received from the local processor core 200, snoop machines 236 that can each independently and concurrently handle a memory access request "snooped" from local interconnect 114, and CO (castout) machines 310 that manage the removal and writeback of memory blocks from cache array 302.

L2 cache 230 further includes an RC queue (RCQ) 320 and a CPI (castout push intervention) queue 318 that buffer data being inserted into and removed from the cache array 302, respectively. RC queue 320 preferably includes multiple buffer entries each individually corresponding to a respective one of RC machines 312 such that each RC machine 312 that is dispatched accesses data in only the corresponding buffer entry. Similarly, CPI queue 318 includes a number of buffer entries that each individually correspond to a particular one of the castout machines 310 and snoop machines 236, such that each CO machine 310 and each snooper 236 that is dispatched accesses data from only the respective designated CPI buffer entry. Data read out from cache array 302 or received from local interconnect 114 is transmitted to an associated processor core 200 via multiplexer M3.

Figure 5:
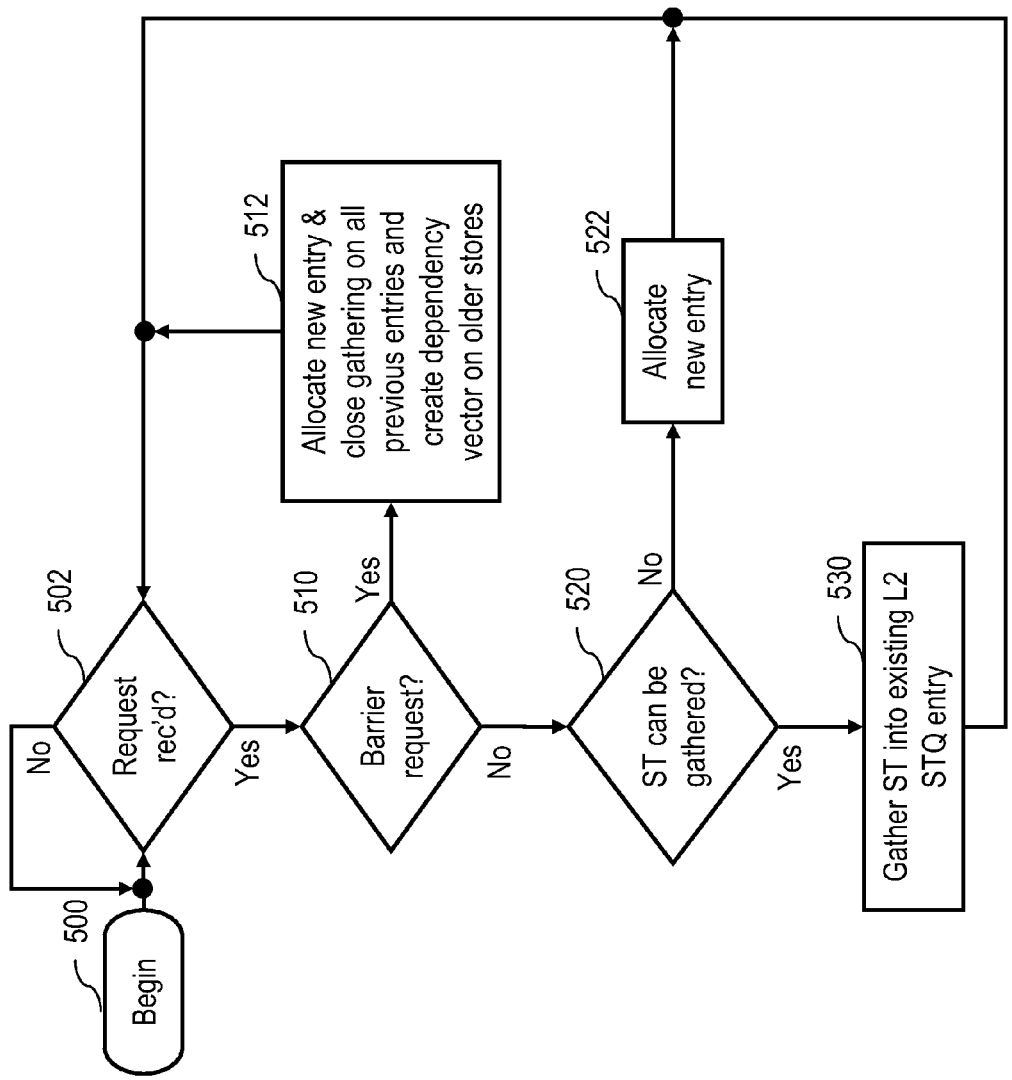
FIG. 5 is a high level logical flowchart of an exemplary process of enqueuing a request received from a processor core within the L2 STQ of an L2 cache in accordance with one embodiment.

Referring now to FIG. 5, there is depicted a high level logical flowchart of an exemplary process of enqueuing a request received from a processor core 200 within the L2 STQ 304 of L2 cache 230 in accordance with one embodiment. The illustrated process begins at block 500 and iterates at block 502 until a request is received from a processor core 200. In response to receipt of the request, the process passes to block 510, which depicts STQ controller 420 determining from the ttype of the received request whether or not the request is a barrier request. If so, L2 STQ controller 420 allocates a new entry 400 to the barrier request in the buffer storage for the appropriate thread and populates valid field 402 and ttype field 406 (block 512). In addition, L2 STQ controller 420 closes store gathering on all previous valid entries 400 for the thread within L2 STQ 304 and constructs a dependency vector (e.g., in DV field 412) identifying the store requests, if any, in L2 STQ 304 that are older than the barrier request and that must therefore complete prior to retirement of the barrier request. Thereafter, the process returns to block 502 to await receipt of a next request.

Returning to block 510, in response to determining that the request received at block 502 is a cacheable store request rather than a barrier request, STQ controller 420 determines at block 520 whether or not the target real address of the cacheable store operation falls within the same memory block as the target address of a previous store operation in the same thread having a valid entry 400 in L2 STQ 304 for which store gathering has not been closed. If so, STQ controller 420 determines that the present cacheable store request can be gathered with the preceding cacheable store request. Accordingly, L2 STQ controller 420 gathers the new cacheable store request by merging the data of the new cacheable store request with the contents of the data field 408 of the entry 400 allocated to the previous cacheable store request (block 530). As will be appreciated, such store gathering advantageously saves the allocation of an additional entry 400 in L2 STQ 304 and the processing associated with the additional entry. If STQ controller 420 determines at block 520 that the new cacheable store request cannot be gathered, L2 STQ controller 420 allocates a new entry 400 to the cacheable store request in the buffer storage of the appropriate thread and populates valid field 402 (i.e., by marking the entry 400 valid), address field 404, ttype field 406, and data field 408 (block 522) In addition, DV field 412 of the entry 400 is additionally updated to indicate the youngest barrier request in L2 STQ 304, if any, that is older than the present store request. Following either block 522 or block 530, the process given in FIG. 5 returns to block 502.

Figure 6:
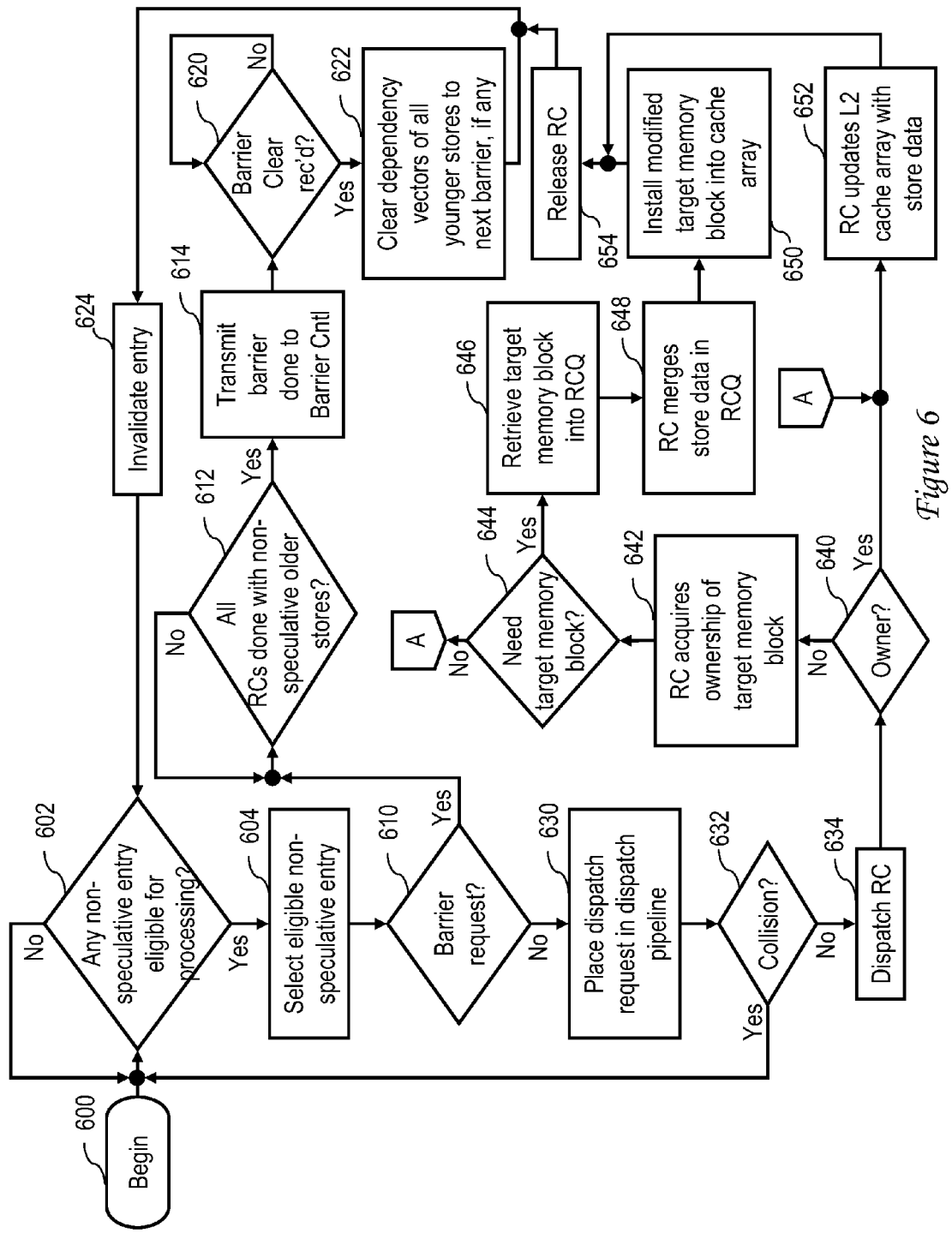
FIG. 6 is a high level logical flowchart of an exemplary process by which a STQ controller dequeues a non-speculative request from the buffer storage of a thread in an L2 STQ in accordance with one embodiment.

With reference now to FIG. 6, there is depicted a high level logical flowchart of an exemplary process by which a STQ controller 420 dequeues a non-speculative request from the buffer storage of a thread in an L2 STQ 304 in accordance with one embodiment. As depicted, the process of FIG. 6 begins at block 600 and then proceeds to block 602, which depicts STQ controller 420 determining whether or not at least one non-speculative entry 400 within the buffer storage of a particular thread in L2 STQ 304 is eligible for processing. A non-speculative entry is one that contains either (1) a barrier request for which all store requests in its dependency vector have been serviced and removed from L2 STQ 304 or (2) a store request not synchronized by an older barrier request in L2 STQ 304 (e.g., having a clear DV field 412). If STQ controller 420 does not identify a non-speculative entry that is eligible for processing, the process iterates at block 602. If, however, STQ controller 420 identifies one or more non-speculative entries eligible for processing, the process proceeds to block 604.

Block 604 depicts STQ controller 420 selecting one of the non-speculative entries 400 eligible for processing. The process then proceeds from block 604 to block 610, which illustrates STQ controller 420 determining from the ttype field 406 of the selected entry 400 whether the request specified therein is a barrier request. If not, the process proceeds to block 630, which is described below. If, however, the selected entry 400 contains a barrier request, STQ controller 420 delays further handling of the barrier request (but not necessarily other enqueued requests) until RC machines 312 have completed processing all older store requests identified in the dependency vector of the barrier request (block 612). Once all previous store operations in L2 STQ 304 have completed, STQ controller 420 asserts its barrier done signal 236, as shown at block 614, and awaits assertion of barrier clear signal 238 by barrier controller 234 at block 620. As described above, barrier controller 234 asserts barrier clear signal 238 when L2 cache 230 and NCU 232 assert all of barrier done signals 236. In response to assertion of barrier clear signal 238, STQ controller 420 clears the DV field 412 of each younger store request in L2 STQ 304 until the next barrier request, if any, is reached, thus indicating that these store requests are now non-speculative (block 622). STQ controller 420 then marks the entry 400 containing the barrier request as invalid (i.e., by resetting valid field 402), signaling retirement of the barrier request (block 624). Thereafter, the process shown in FIG. 6 returns to block 602.

Referring now to block 630, if the request buffered in the entry 400 of L2 STQ 304 selected for processing is a store request and not a barrier request, STQ controller 420 places a dispatch request identifying the target address of the store request in dispatch pipeline 306 as shown at block 630. As illustrated at block 632, dispatch pipeline 306 determines whether or not the target address of the dispatch request collides with (i.e., matches) a target address of a request already being processed by one of CO machines 310, RC machines 312, or SN machines 236. If so, dispatch pipeline 306 denies the dispatch request, processing of the selected entry 400 of L2 STQ 304 is suspended, and the process returns to block 602. If, however, dispatch pipeline 306 does not detect an address collision at block 632, dispatch pipeline 306 dispatches an RC machine 312 to process the selected store request and passes to the dispatched RC machine 312 the coherence state read from directory 308 (block 634).

As indicated at block 640, the handling of the store request by the dispatched RC machine 312 depends upon whether the coherence state received with the store request indicates that the L2 cache 230 of the RC machine 312 has coherence ownership of and/or a valid copy of the target memory block of the store request. If the coherence state indicates that the L2 cache 230 already has coherence ownership of the target memory block, then in a preferred embodiment the L2 cache 230 also holds a cached copy of the target memory block. Accordingly, RC machine 312 simply updates cache array 302 with the store data contained in data field 408 of the L2 STQ entry 400 of the store request (block 652). Thereafter, the RC machine 312 is released (block 654), and STQ controller 420 invalidates the entry 400 in L2 STQ 304 of the store request that has been serviced (block 624). The process then returns to block 602.

Returning to block 640, if the coherence state indicates that the L2 cache 230 does not currently hold coherence ownership of the target memory block of the store request selected for processing, then the dispatched RC machine 312 acquires coherence ownership of the target memory block of the store request, for example, by issuing a request on its local interconnect (block 642). As indicated at block 644, if the coherence state passed to the RC machine 312 indicates L2 cache 230 already holds a valid copy of the target memory block, then the process passes through page connector A to block 652, which has been described. If, however, the coherence state indicates that L2 cache 230 does not hold a valid copy of the target memory block, RC machine 312 additionally retrieves a copy of the target memory block into its corresponding entry in RCQ 320 (block 646). RC machine 312 can retrieve a copy of the target memory block from another L2 cache 230 of system memory 108 by issuing an appropriate operation on local interconnect 114. As will be appreciated, the operation utilized to retrieve a copy of the target memory block at block 646 can be, but is not required to be, the same operation as that employed to obtain coherence ownership of the target memory block at block 642.

Once the RC machine 312 has acquired coherence ownership of the target memory block and has obtained a copy of the target memory block, RC machine 312 merges the store data specified in the data field 408 of the L2 STQ entry 400 of the store request into the target memory block residing in RCQ 320 (block 648). RC machine 312 then installs the modified target memory block into cache array 302 (block 650). Thereafter, the RC machine 312 is released (block 654), and STQ controller 420 invalidates the entry 400 in L2 STQ 304 of the store request that has been serviced (block 624). The process of FIG. 6 then returns to block 602.

Figure 7:
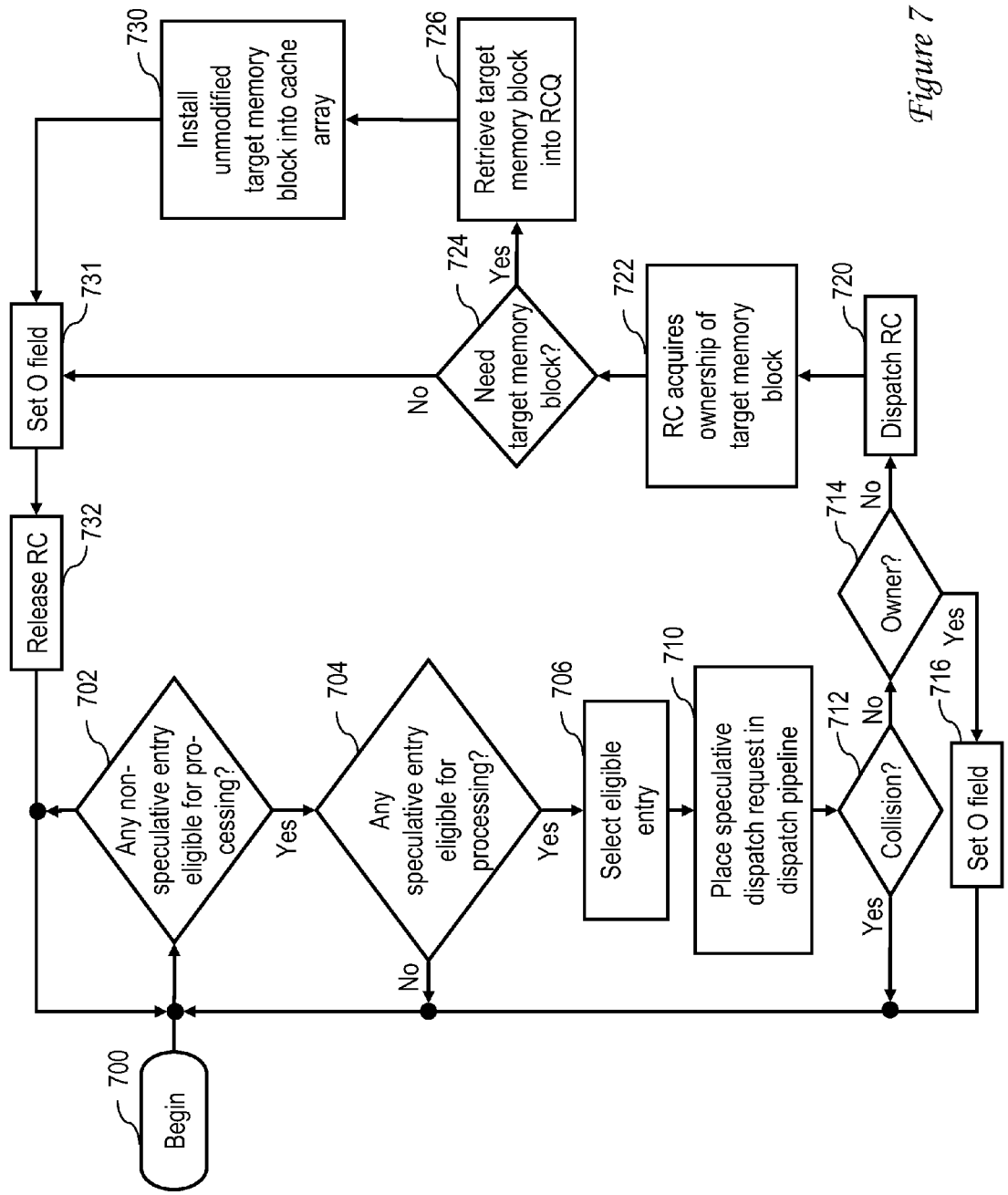
FIG. 7 is a high level logical flowchart of an exemplary process by which an RC machine is dispatched to service a speculative store request in an L2 STQ in accordance with a first embodiment.

Referring now to FIG. 7, there is depicted a high level logical flowchart of an exemplary method of processing a speculative store request in an L2 STQ 304 in accordance with a first embodiment. As depicted, the process of FIG. 7 begins at block 700 and then proceeds to block 702, which depicts STQ controller 420 determining whether or not at least one non-speculative entry 400 within the buffer storage of a particular thread in L2 STQ 304 is eligible for processing. As noted above, a non-speculative entry is one that contains either (1) a barrier request for which all store requests in its dependency vector have been serviced and removed from L2 STQ 304 or (2) a store request not synchronized by an older barrier request in L2 STQ 304 (i.e., having a clear DV field 412). If STQ controller 420 identifies one or more non-speculative entries in L2 STQ 304 that are eligible for processing, the process iterates at block 702 until all non-speculative entries in L2 STQ 304 that are eligible for processing have been processed.

If, however, STQ controller 420 does not identify any non-speculative entry in L2 STQ 304 that is eligible for processing, STQ controller 420 determines at block 704 if one or more speculative entries in L2 STQ 304 are eligible for processing. Each such speculative entry 400 specifies a store request that cannot be completed until an older barrier present in L2 STQ 304 and identified by its DV field 412 is retired. Speculative entries 400 are eligible for processing only if the associated O field 410 is reset (i.e., not set) to indicate that the L2 cache 230 is not known by STQ controller 420 to hold coherence ownership of the target memory block of the speculative store request. If STQ controller 420 determines at block 704 that L2 STQ 304 does not contain any speculative entry that is eligible for processing, the process returns to block 702, which has been described. If, however, STQ controller 420 determines that L2 STQ 304 contains at least one speculative entry that is eligible for processing, the process proceeds from block 704 to block 706.

Block 706 depicts STQ controller 420 selecting one of the speculative entries 400 in L2 STQ 304 that is eligible for processing. It should be noted that in making the selection of an eligible entry 400, STQ controller 420 does not enforce any ordering between any newer store requests with respect to any older barrier requests that may be present, meaning that STQ controller 420 can select a newer store request for speculative processing in advance of any number of older barrier requests (or other store requests) present in L2 STQ 304 and can do so in any order. The process then proceeds from block 706 to block 710, which illustrates STQ controller 420 placing a speculative dispatch request identifying the target address of the as-yet speculative store request in dispatch pipeline 306.

As illustrated at block 712, dispatch pipeline 306 determines whether or not the target address of the speculative dispatch request collides with (i.e., matches) a target address of a request already being processed by one of CO machines 310, RC machines 312, or SN machines 236. If so, dispatch pipeline 306 denies the speculative dispatch request, processing of selected speculative entry 400 of L2 STQ 304 is suspended, and the process returns to block 702. If, however, dispatch pipeline 306 does not detect an address collision at block 712, dispatch pipeline 306 performs a lookup of the target address of the speculative store request in directory 308 and determines at block 714 whether or not the returned coherence state indicates that the L2 cache 230 holds coherence ownership of the target memory block of the speculative store request. If so, meaning that L2 cache 230 holds a valid copy of the target memory block and the authority to modify it once the older barrier request in L2 STQ 304 is retired, dispatch pipeline 306 sets 0 field 410 of the L2 STQ entry 400 associated with the speculative store request to indicate to STQ controller 420 that L2 cache 230 holds coherence ownership of the target memory block of the speculative store request (block 716). Thereafter, processing of the speculative store request (and the associated speculative dispatch request) ends, and the process returns to block 702.

Referring again to block 714, if dispatch pipeline 306 determines that the coherence state of the target memory block of the speculative store request does not indicate that the L2 cache 230 holds coherence ownership of the target memory block, then dispatch pipeline 306 dispatches an RC machine 312 to process the speculative store request and passes to the dispatched RC machine 312 the coherence state read from directory 308 (block 720). In response to the speculative store request, the dispatched RC machine 312 acquires coherence ownership of the target memory block of the speculative store request, for example, by issuing a request on its local interconnect (block 722). As indicated at block 724, if the coherence state passed to the RC machine 312 indicates L2 cache 230 already holds a valid copy of the target memory block of the speculative store request, the process passes to block 731, which is described below. If, however, the coherence state indicates that L2 cache 230 does not hold a valid copy of the target memory block, RC machine 312 additionally retrieves a copy of the target memory block of the speculative store request from another L2 cache 230 of system memory 108 into its corresponding entry in RCQ 320, for example, by issuing an appropriate operation on local interconnect 114 (block 726). Again, the operation utilized to retrieve a copy of the target memory block at block 726 can be, but is not required to be, the same operation as that employed to obtain coherence ownership of the target memory block at block 722.

Once the RC machine 312 has acquired coherence ownership of the target memory block and has obtained a copy of the target memory block, RC machine 312 installs the unmodified target memory block into cache array 302 without performing the update indicated by the as-yet speculative store request (block 730). The process then passes to block 731, which depicts the RC machine 312 setting the 0 field 410 of the L2 STQ entry 400 associated with the speculative store request to indicate to STQ controller 420 that L2 cache 230 holds coherence ownership of the target memory block of the speculative store request. Consequently, STQ controller 420 will not again consider the entry 400 of the speculative store request eligible for processing at block 704. Following block 731, the RC machine 312 is released (block 732), and the process returns to block 702, which has been described.

Thus, in FIG. 7, a newer store request is processed speculatively in advance of an older barrier request, with all associated actions being performed in advance of retirement of the older barrier request except for the modification of the target memory block with the store data. Once the older barrier request retires, the speculative store request becomes non-speculative and is processed in accordance with the process depicted in FIG. 6.

Figure 8:
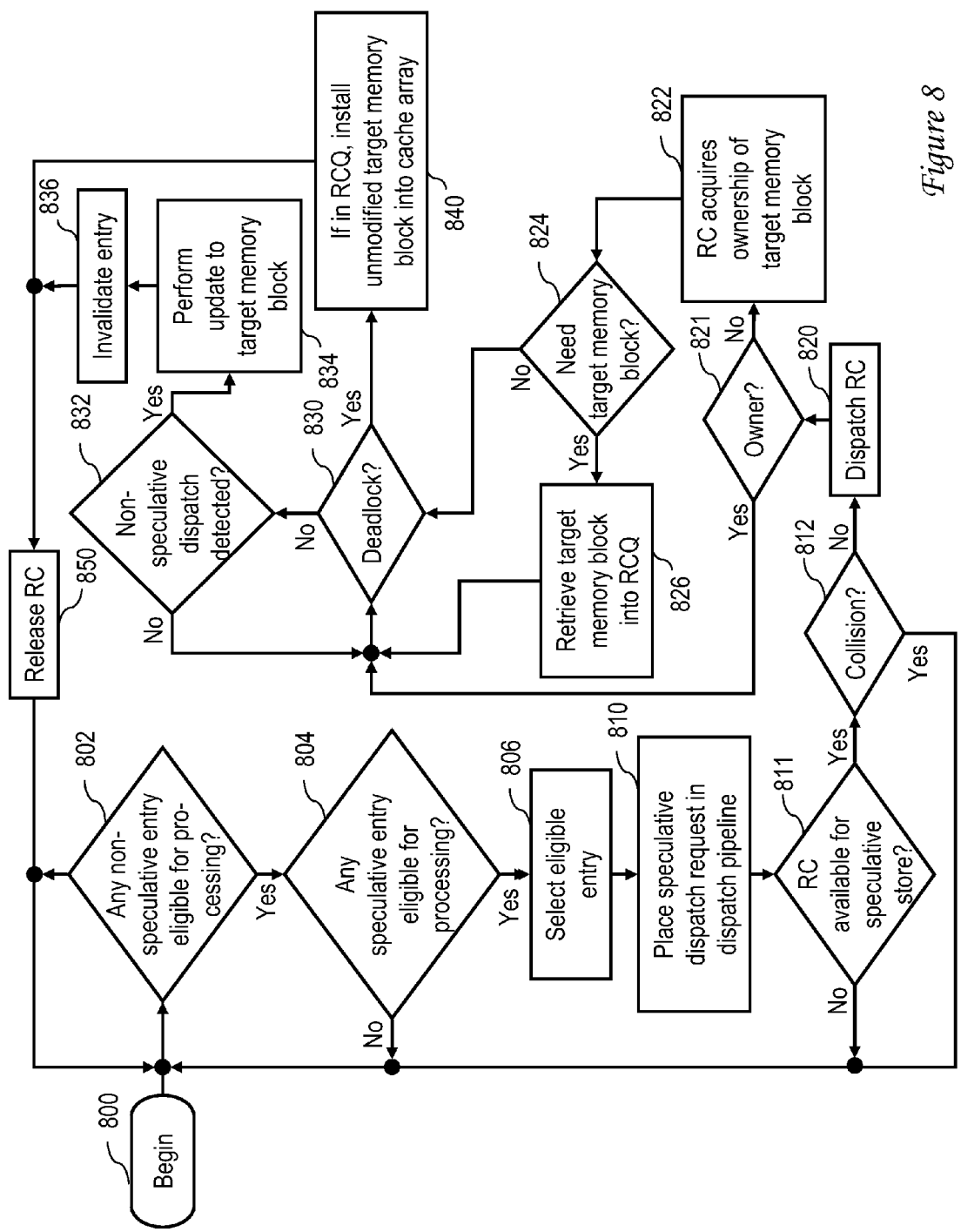
FIG. 8 is a high level logical flowchart of an exemplary process by which an RC machine is dispatched to service a speculative store request in an L2 STQ in accordance with a second embodiment.

Referring now to FIG. 8, there is depicted a high level logical flowchart of an exemplary method of processing a speculative store request in an L2 STQ 304 in accordance with a second embodiment. As can be seen by comparison of FIGS. 7-8, the second embodiment in FIG. 8 is similar the first embodiment shown in FIG. 7; however, in the second embodiment given in FIG. 8, RC machines 312 working on speculative store requests attempt to remain active until the speculative store requests become non-speculative.

The process of FIG. 8 begins at block 800 and then proceeds to block 802, which depicts STQ controller 420 determining whether or not at least one non-speculative entry 400 within the buffer storage of a particular thread in L2 STQ 304 is eligible for processing. If STQ controller 420 identifies one or more non-speculative entries in L2 STQ 304 that are eligible for processing, the process iterates at block 802 until all non-speculative entries in L2 STQ 304 that are eligible for processing have been processed.

If, however, STQ controller 420 does not identify any non-speculative entry in L2 STQ 304 that is eligible for processing, STQ controller 420 determines at block 804 if one or more speculative entries in L2 STQ 304 are eligible for processing. Each such speculative entry specifies a store request that cannot be completed until an older barrier present in L2 STQ 304 and identified by its DV field 412 is retired. If STQ controller 420 determines at block 804 that L2 STQ 304 does not contain any speculative entry that is eligible for processing, the process returns to block 802, which has been described. If, however, STQ controller 420 determines that L2 STQ 304 contains at least one speculative entry that is eligible for processing, the process proceeds from block 804 to block 806.

Block 806 depicts STQ controller 420 selecting one of the speculative entries 400 in L2 STQ 304 that is eligible for processing. Again, in making the selection of an eligible entry 400, STQ controller 420 does not enforce any ordering between any newer store requests with respect to any older barrier requests that may be present, meaning that STQ controller 420 can select a newer store request for speculative processing in advance of any number of older barrier requests (or other store requests) present in L2 STQ 304 and can do so in any order. The process then proceeds from block 806 to block 810, which illustrates STQ controller 420 placing a speculative dispatch request identifying the target address of the as-yet speculative store request in dispatch pipeline 306.

As illustrated at block 811, dispatch pipeline 306 determines whether or not an RC machine 312 is available to handle a speculative store request. That is, in order to avoid deadlocks, dispatch pipeline 306 determines (e.g., based upon a predetermined constant or an adjustable threshold set in response to performance data) whether or not a minimum threshold number of RC machines 312 would be available for handling non-speculative store requests if an RC machine 312 were dispatched to handle the speculative store request under consideration. In response to a negative determination at block 811, processing of the speculative store request ends, and the process returns to block 802, which has been described. If, however, dispatch pipeline 306 makes an affirmative determination at block 811, the process passes to block 812.

At block 812, dispatch pipeline 306 determines whether or not the target address of the speculative dispatch request collides with (i.e., matches) a target address of a request already being processed by one of CO machines 310, RC machines 312, or SN machines 236. If so, dispatch pipeline 306 denies the speculative dispatch request, processing of selected speculative entry 400 of L2 STQ 304 is suspended, and the process returns to block 802. If, however, dispatch pipeline 306 does not detect an address collision at block 812, dispatch pipeline 306 performs a lookup of the target address of the speculative store request in directory 308, dispatches an RC machine 312 to process the speculative store request, and passes to the dispatched RC machine 312 the coherence state read from directory 308 (block 820).

The dispatched RC machine 312 then determines at block 821 whether or not the coherence state received from dispatch pipeline 306 indicates that the L2 cache 230 holds coherence ownership of the target memory block of the speculative store request. If so, meaning that L2 cache 230 holds a valid copy of the target memory block and the authority to modify it once the older barrier request in L2 STQ 304 is retired, processing of the speculative store request proceeds to block 830, which is described below.

Referring again to block 821, if the dispatched RC machine 312 determines that the coherence state of the target memory block of the speculative store request does not indicate that the L2 cache 230 holds coherence ownership of the target memory block, then the dispatched RC machine 312 acquires coherence ownership of the target memory block of the speculative store request, for example, by issuing a request on its local interconnect (block 822). As indicated at block 824, if the coherence state passed to the RC machine 312 indicates L2 cache 230 already holds a valid copy of the target memory block of the speculative store request, then the process passes to block 830, which is described below. If, however, the coherence state indicates that L2 cache 230 does not hold a valid copy of the target memory block, RC machine 312 additionally retrieves a copy of the target memory block of the speculative store request from another L2 cache 230 of system memory 108 into its corresponding entry in RCQ 320, for example, by issuing an appropriate operation on local interconnect 114 (block 826). The operation utilized to retrieve a copy of the target memory block at block 826 can be, but is not required to be, the same operation as that employed to obtain coherence ownership of the target memory block at block 822.

Once the RC machine 312 has acquired coherence ownership of the target memory block and has obtained a copy of the target memory block, RC machine 312 makes an implementation-specific determination at block 830 whether or not keeping RC machine 312 active processing the speculative store request contributes to a deadlock condition in data processing system 100. The determination depicted at block 830 depends, inter alia, on the coherence protocol implemented by data processing system 100 and the other operations concurrently "in-flight" in data processing system 100. In response to RC machine 312 determining at block 830 that continuing processing the speculative store request contributes to a deadlock condition, RC machine 312, if the target memory block is being held in RCQ 320, installs the unmodified target memory block from RCQ into cache array 302 without performing the update indicated by the as-yet speculative store request (block 840). The process passes to block 850, which depicts the release of RC machine 312 (i.e., RC machine 312 ending its processing of the speculative store request and returning to an idle state). Thereafter, and the process returns to block 802.

Returning to block 830, in response to RC machine 312 determining that its continued processing of the speculative store request does not contribute to a deadlock condition, the process proceeds to block 832. Block 832 depicts RC machine 312 determining whether or not it has received a notification from dispatch pipeline 306 of the presence in dispatch pipeline 306 of a non-speculative dispatch request specifying the same target address as the speculative store request, where such a notification indicates that the older barrier request that delayed the performance of the store request (and made it speculative) has retired since RC machine 312 was dispatched. If not, RC machine 312 continues to stay active and wait for the speculative store request to become non-speculative. Accordingly, the process returns to block 830, which has been described. If, however, RC machine 312 makes an affirmative determination at block 832, meaning that the store request is no longer speculative, then RC machine 312 updates cache array 302 with the store data from data field 408 (block 834). If RC machine 312 retrieved the target memory block of the store request into RCQ 320 at block 826, RC machine 312 performs the update to the target memory block by merging the store data with the copy of the target memory block in RCQ 320 and then installing the modified target memory block from RCQ 320 into cache array 302. If, on the other hand, RC machine 312 did not need to retrieve a copy of the target memory block because a copy of the target memory block was already present in cache array 302, then RC machine 312 performs the update to the target memory block depicted at block 834 by simply writing the store data into cache array 302.

In response to performing the update to the target memory block, RC machine 312 invalidates the L2 STQ entry 400 of the store request, thus removing it from L2 STQ 304 (block 836). Thereafter, the process passes to block 850, which has been described.

In the process depicted in FIG. 8, a newer store request is processed speculatively in advance of an older barrier request, with all associated actions being performed in advance of retirement of the older barrier request except for the modification of the target memory block with the store data. As long as the doing so does not contribute to a deadlock condition, an RC machine 312 of L2 cache 230 remains active with the speculative store request until the older barrier request retires, enabling the now non-speculative store request to be completed immediately.

While various embodiments have been particularly shown as described, it will be understood by those skilled in the art that various changes in form and detail may be made therein without departing from the spirit and scope of the invention recited in appended claims. For example, although aspects have been described with respect to a data processing system and various processes, it should be understood that present invention may alternatively be implemented as a program product including a storage medium storing program code that can be processed by a data processing system.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of processing store requests in a data processing system, the method comprising:
enqueuing a store request in a store queue of a cache memory of the data processing system, the store request identifying a target memory block by a target address and specifying store data;
while the store request and a barrier request older than the store request are enqueued in the store queue, dispatching a read-claim machine of the cache memory to acquire coherence ownership of the target memory block of the store request; and after coherence ownership of the target memory block is acquired and the barrier request has been retired from the store queue, updating a cache array of the cache memory with the store data.

2. The method of claim 1, and further comprising:

in response to the dispatching of the read-claim machine, the read-claim machine initiating an operation to acquire the target memory block; and in response to receipt of the target memory block and presence of the older barrier request in the store queue, installing the target memory block unmodified by store data of the store request into a cache array of the cache memory.

3. The method of claim 2, and further comprising releasing the read-claim machine in response to the installing.

4. The method of claim 1, wherein:

the read-claim machine is a first read-claim machine; and the updating comprises dispatching a second read-claim machine to perform the updating of the cache array.

5. The method of claim 1, wherein the dispatching comprises:

dispatching the read-claim machine in response a lookup of a directory of the cache memory indicating the cache memory does not have coherence ownership of the target memory block and otherwise refraining from the dispatching.

6. The method of claim 1, wherein the dispatching comprises dispatching the read-claim machine in response to a determination that doing would leave a minimum threshold number of read-claim machines available to process non-speculative store requests.

7. The method of claim 1, wherein:

the method further comprises the read-claim machine remaining active with the store request until the barrier request has been retired from the store queue; and the updating comprises the read-claim machine updating the cache array of the cache memory with the store data.

8. The method of claim 1, wherein:

the method further comprises the read-claim machine determining whether the read-claim machine remaining active contributes to a deadlock condition;

the read-claim machine remains active only in response to a determination that the read-claim machine remaining active does not contribute to a deadlock condition; and in response to the read-claim machine determining that the read-claim machine remaining active contributes to a deadlock condition, the read-claim machine ending processing of the store request.

\* \* \* \* \*